United States Patent
Arendsen et al.

(10) Patent No.: US 10,137,840 B2
(45) Date of Patent: Nov. 27, 2018

(54) VEHICLE INTERIOR COMPONENT

(71) Applicant: Shanghai Yanfeng Jinqiao Automotive Trim Systems Co. Ltd, Novi, MI (US)

(72) Inventors: Randy Len Arendsen, Zeeland, MI (US); Rick Alan Anderson, Grand Haven, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 15/698,139

(22) Filed: Sep. 7, 2017

(65) Prior Publication Data

US 2017/0368998 A1 Dec. 28, 2017

Related U.S. Application Data

(63) Continuation of application No. PCT/US2015/021981, filed on Mar. 23, 2015.

(51) Int. Cl.
*B60R 7/04* (2006.01)
*B60R 7/08* (2006.01)
*B60R 11/00* (2006.01)

(52) U.S. Cl.
CPC ............... *B60R 7/04* (2013.01); *B60R 7/082* (2013.01); *B60R 2011/0028* (2013.01);
(Continued)

(58) Field of Classification Search
CPC ... B60R 2011/0094; B60R 7/04; B60R 7/082; B60R 2011/0075
(Continued)

(56) References Cited

U.S. PATENT DOCUMENTS 4,552,399 A * 11/1985 Atarashi .................. B60R 7/06
292/DIG. 22
4,641,747 A * 2/1987 Mestdagh .......... G11B 33/0444
206/308.1
(Continued)

FOREIGN PATENT DOCUMENTS

DE 102006043540 B3 2/2008
EP 3072745 B1 11/2017

OTHER PUBLICATIONS

Written Opinion for International Application No. PCT/US2015/021981 dated Dec. 3, 2015.
(Continued)

*Primary Examiner* — Pinel E Romain

(57) ABSTRACT

A component for a vehicle interior is disclosed. The component may comprise a housing comprising a tab and a cover coupled to the housing for movement between a closed position and an open position. The tab may exert a force against the cover when closed. The tab may be integrally formed with the housing. The tab may comprise a first portion coupled to the housing and a second portion comprising an arcuate protrusion to exert the force against the cover. The component may comprise a latch to secure the cover to the housing when closed. The tab may prevent latch disengagement. The tab may comprise a leaf spring. The component may comprise a biasing member coupled to the housing to exert a force against the cover through the tab when the cover is closed. The component may comprise a storage assembly, a sunglass bin or a console.

20 Claims, 5 Drawing Sheets

(52) U.S. Cl.
CPC ............... *B60R 2011/0059* (2013.01); *B60R 2011/0075* (2013.01); *B60R 2011/0094* (2013.01)

(58) Field of Classification Search
USPC ....................................................... 296/37.8
See application file for complete search history.

(56) References Cited

U.S. PATENT DOCUMENTS

| | | | | |
|---|---|---|---|---|
| 4,925,072 | A | * | 5/1990 | Masler ................... B60N 3/083 224/280 |
| 5,267,761 | A | | 12/1993 | Curtindale et al. |
| 5,292,174 | A | | 3/1994 | Ohnuma |
| 6,062,623 | A | * | 5/2000 | Lemmen ................... B60R 7/04 224/282 |
| 6,789,831 | B2 | * | 9/2004 | Schmidt ................. B60K 37/06 296/37.12 |

OTHER PUBLICATIONS

International Search Report for International Application No. PCT/US2015/021981 dated Dec. 3, 2015.
Extended European Search Report for European Application No. EP16161243.7 dated Aug. 12, 2016.
Reply to Extended European Search Report with amended claims for European Application No. EP16161243.7 dated Feb. 6, 2017.
File history from the European Patent Office for EP Patent Application No. 16161243.7 as of Aug. 2, 2018 (in English) (152 pages).

\* cited by examiner

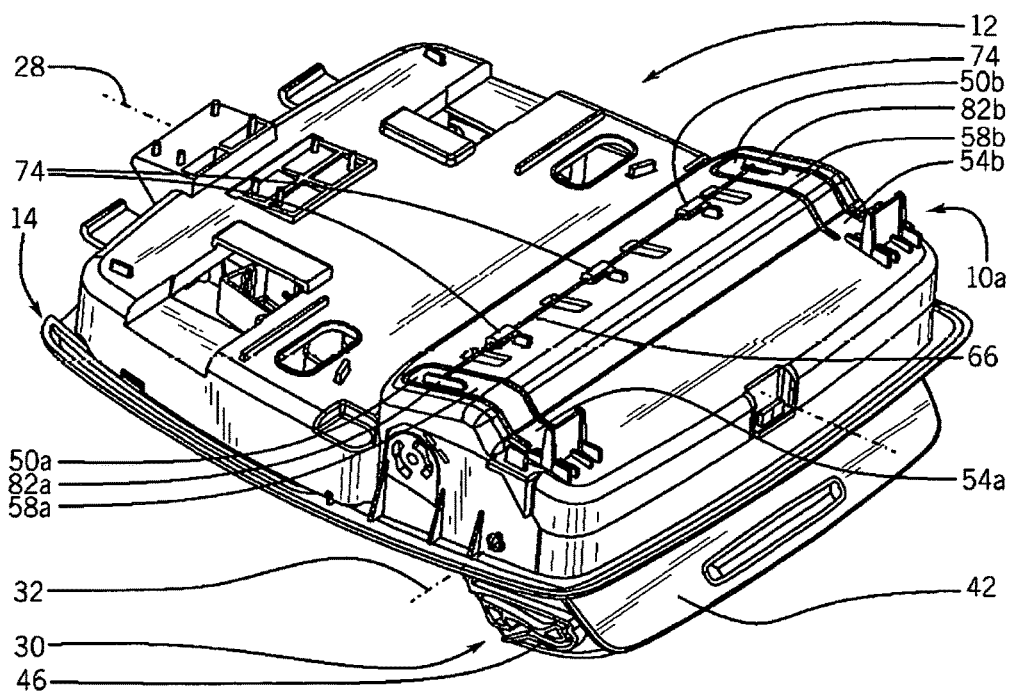
FIG. 5
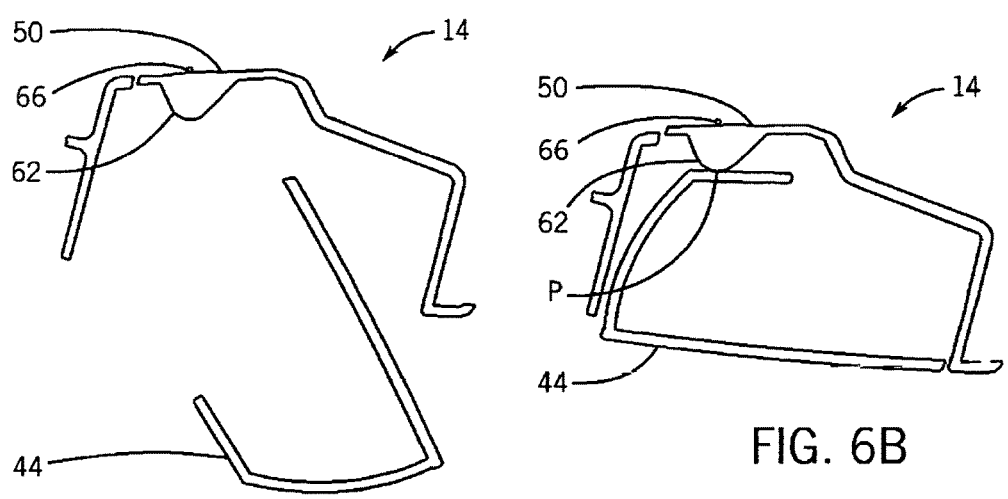
FIG. 6A
FIG. 6B

VEHICLE INTERIOR COMPONENT

CROSS REFERENCE TO RELATED APPLICATIONS

The present application is a continuation of the International (PCT) Patent Application Serial No. PCT/US2015/021981, entitled "VEHICLE STORAGE ASSEMBLY", filed Mar. 23, 2015, which is incorporated by reference in its entirety.

FIELD

The present invention relates to a vehicle interior component.

BACKGROUND

It is well-known for a component in a vehicle interior to include a compartment for storing small personal articles and other items. For example, an overhead console in a vehicle may include a movable storage compartment suitable for storing sunglasses.

It would be advantageous to provide an overhead console with a housing and a storage compartment that does not generate noise or rattle due to the vibration of the vehicle. It would also be advantageous to bias the storage compartment to prevent movement of the storage compartment with respect to the housing when the storage compartment is closed.

SUMMARY

The present invention relates to a component for a vehicle interior comprising (a) a housing comprising a tab; and (b) a cover pivotally coupled to the housing for movement between a closed position and an open position for access. The tab may be configured to exert a force against the cover in the closed position. The tab may be integrally formed with the housing. The tab may comprise a first portion coupled to the housing and a second portion configured to exert the force against the cover in the closed position. The second portion of the tab may comprise a protrusion configured to exert the force against the cover in the closed position. The protrusion may comprise an arcuate profile. The component may comprise a latch configured to secure the cover to the housing in the closed position. The tab may be configured to at least partially prevent disengagement of the latch. The tab may be configured not to exert any force against the cover when in the open position. The force may comprise a preload force. The tab may comprise a leaf spring. The component may comprise at least one of (a) a storage assembly, (b) a sunglass bin, (c) a console.

The present invention also relates to a component for a vehicle interior comprising: (a) a housing comprising a tab; (b) a cover pivotally coupled to the housing for movement between a closed position and an open position for access; and (c) a biasing member coupled to the housing. The biasing member may be configured to exert a first force against the cover through the tab when the cover is in the closed position. The tab may be configured to exert a second force against the cover in the closed position. The biasing member may comprise a spring wire. The first force may comprise a supplemental preload force. The housing may comprise at least one hook configured to couple the biasing member to the housing. The tab may comprise a rib configured to engage the biasing member to prevent axial translation of the biasing member. The tab may be integrally formed with the housing. The tab may comprise a first portion coupled to the housing and a second portion configured to exert the second force against the cover in the closed position. The component may comprise a latch configured to secure the cover to the housing in the closed position. The tab may be configured to at least partially prevent disengagement of the latch. The tab may be configured not to exert any force against the cover when in the open position.

FIGURES

FIG. 1A is a schematic perspective view of a vehicle according to an exemplary embodiment.

FIG. 1B is a schematic perspective front view of a vehicle interior according to an exemplary embodiment.

FIG. 5 is a schematic top perspective view of a vehicle interior component according to an exemplary embodiment.

FIGS. 6A and 6B are schematic partial side cross-section views of a vehicle interior component as shown in FIGS. 4A and 4B according to an exemplary embodiment.

DESCRIPTION

Figure 1C:
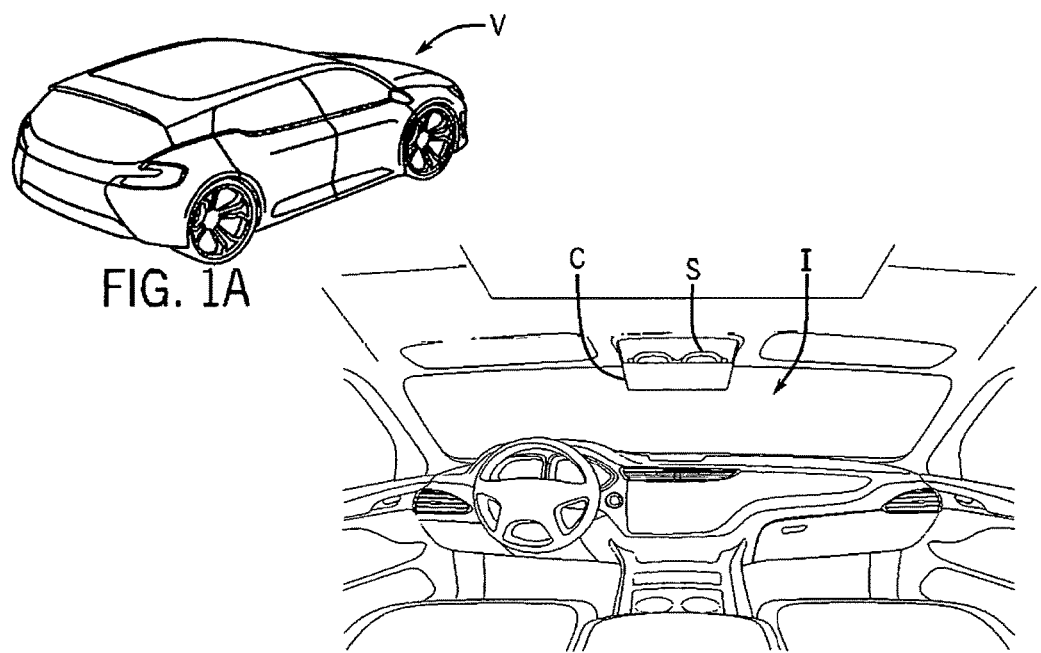
FIG. 1C is a schematic top perspective view of a vehicle interior component according to an exemplary embodiment.
Figure 1C:
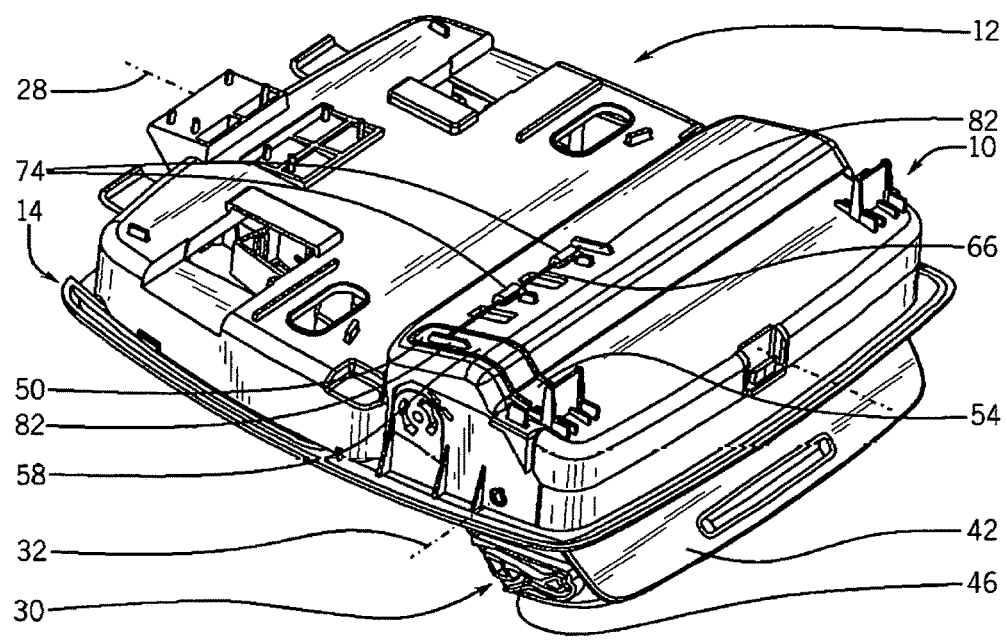

According to an exemplary embodiment as shown schematically in FIGS. 1A to 1B, a vehicle V is shown including an interior I with a component C for storing items such as sunglasses S. According to an exemplary embodiment, component C may be configured to move between a closed position and an open position allowing access to sunglasses S.

According to an exemplary embodiment as shown schematically in FIGS. 1C to 2B, a component 10 (e.g. a console, storage compartment, a storage bin, a sunglass bin, etc.) for a vehicle interior is shown. Component 10 may comprise a housing 14, a cover 30, a latch 46, a tab 50, and a biasing member 66. Housing 14 may comprise a cavity 26 (see FIG. 2B) for storing cover 30 (see FIG. 4A). According to an exemplary embodiment, cover 30 may comprise a top portion 42, a rim portion 44 (see FIG. 4A), and the latch 46. According to an exemplary embodiment, cover 30 may comprise a receptacle or storage compartment 38 configured to hold small items such as sunglasses (see FIG. 4A). Latch 46 may be configured to secure cover 30 to housing 14 in a closed position. According to an exemplary embodiment, latch 46 may be a push-push type latch. Tab 50 may comprise a first portion 54 and a second portion 58. According to an exemplary embodiment, tab 50 may comprise a leaf spring.

Figure 2A:
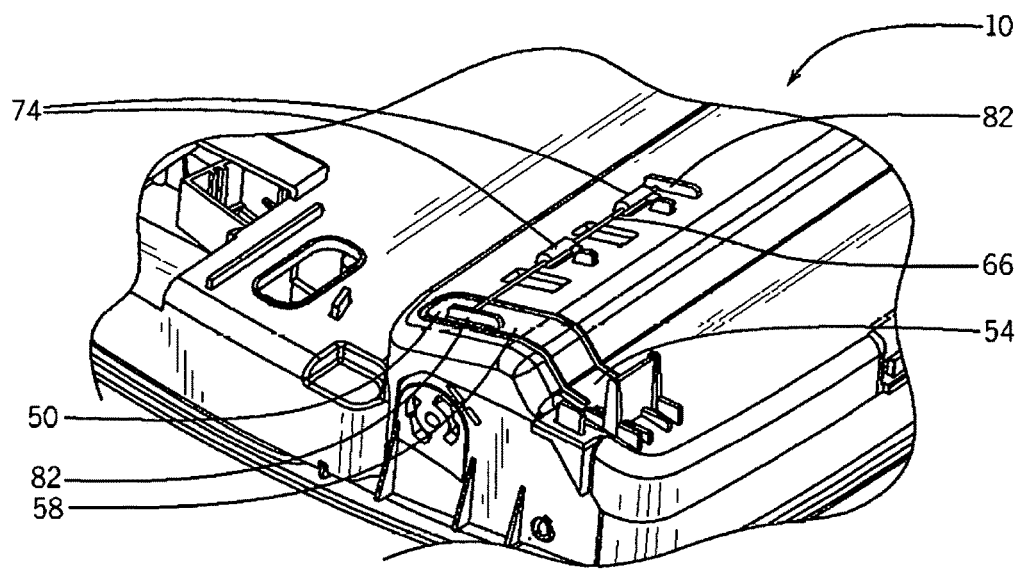
FIG. 2A is a schematic enlarged top perspective view of a portion of the vehicle interior component of FIG. 1C according to an exemplary embodiment.
Figure 2B:
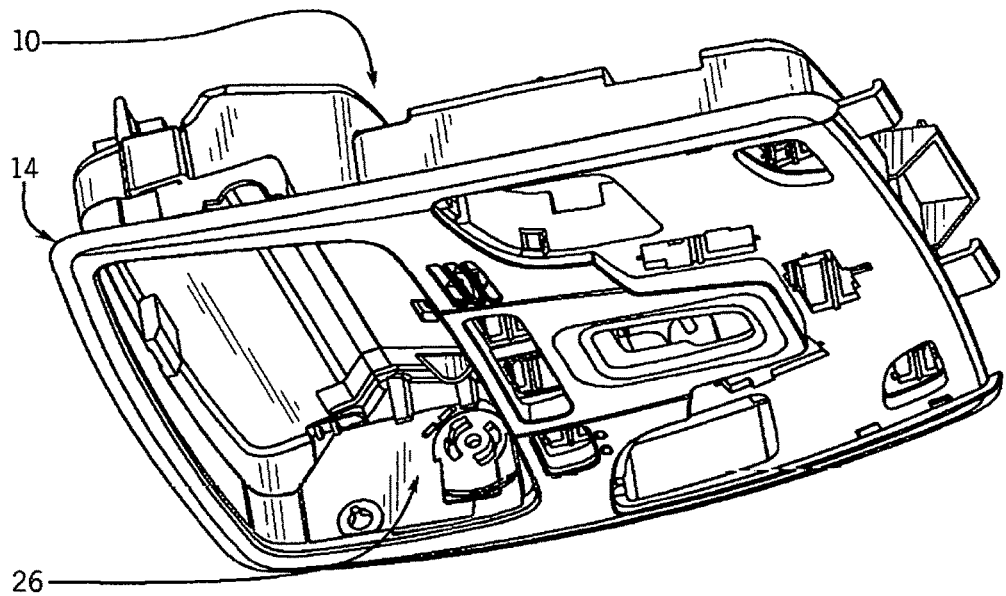
FIG. 2B is a schematic bottom perspective view of a housing for a vehicle interior component according to an exemplary embodiment.
Figure 3A:
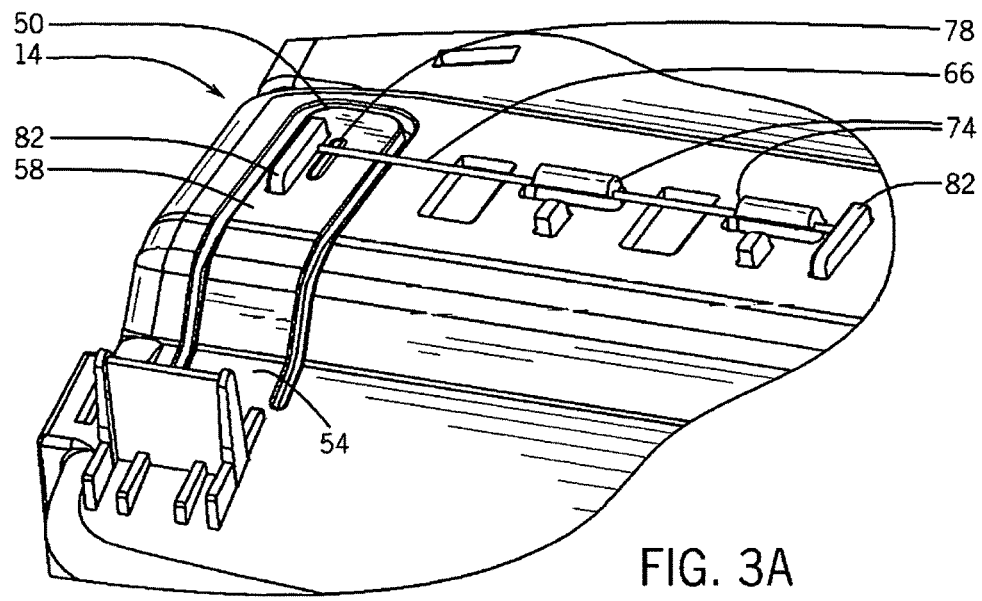
FIG. 3A is a schematic enlarged top perspective view of a portion of a vehicle interior component according to an exemplary embodiment.

According to an exemplary embodiment, biasing member 66 may be coupled to housing 14 by at least one support member as shown schematically in FIGS. 1C, 2A and 3A as hook or hooks 74. As shown schematically in FIGS. 1C and 2A, biasing member 66 may be engaged with large ribs 82 so as to prevent axial translation of biasing member 66. According to an exemplary embodiment, biasing member 66 may comprise a spring wire. According to an exemplary embodiment, a first one of large ribs 82 may be integral with tab 50 and a second one of large ribs 82 may be integral with housing 14.

Figure 3B:
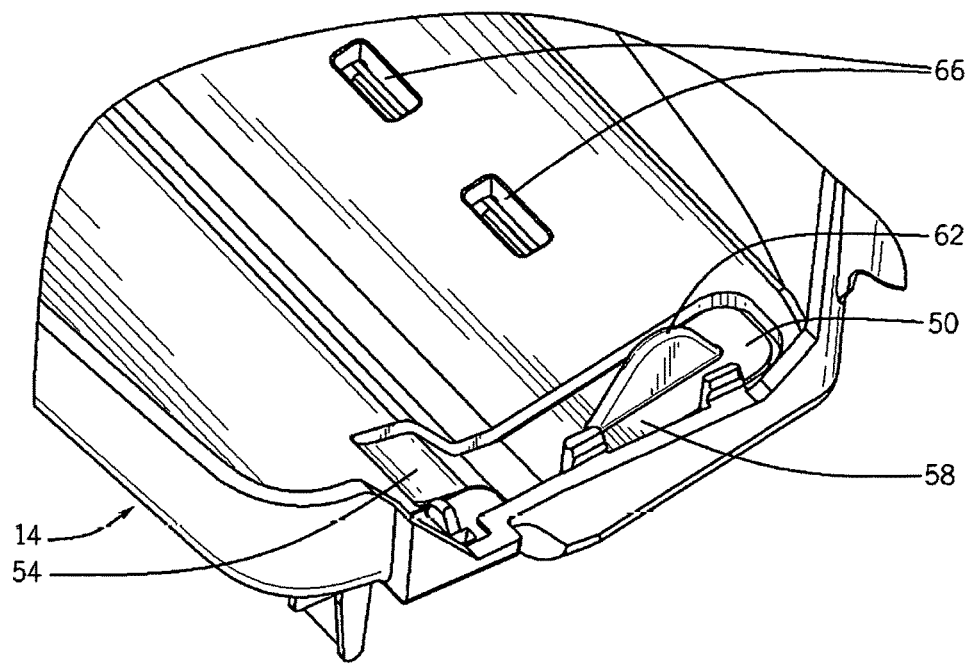
FIG. 3B is a schematic enlarged bottom perspective view of a portion of a vehicle interior component according to an exemplary embodiment.

According to an exemplary embodiment as shown schematically in FIGS. 3A and 3B, tab 50 may be integrally formed with housing 14. According to an exemplary embodiment, tab 50 may comprise a small rib 78. Small rib 78 may be configured to contact a portion of biasing member 66 and preload the portion of biasing member 66 with a supplemental preload force when tab 50 is in an undeflected state. As shown schematically in FIG. 3B, tab 50 may comprise a protrusion 62 extending into cavity 26 (see FIG. 2B). Protrusion 62 may be configured to engage with and exert a force against cover 30 when cover 30 is in the closed position. According to an exemplary embodiment, protrusion 62 may comprise an arcuate profile. According to an exemplary embodiment, second portion 58 of tab 50 may comprise protrusion 62.

Figure 4A:
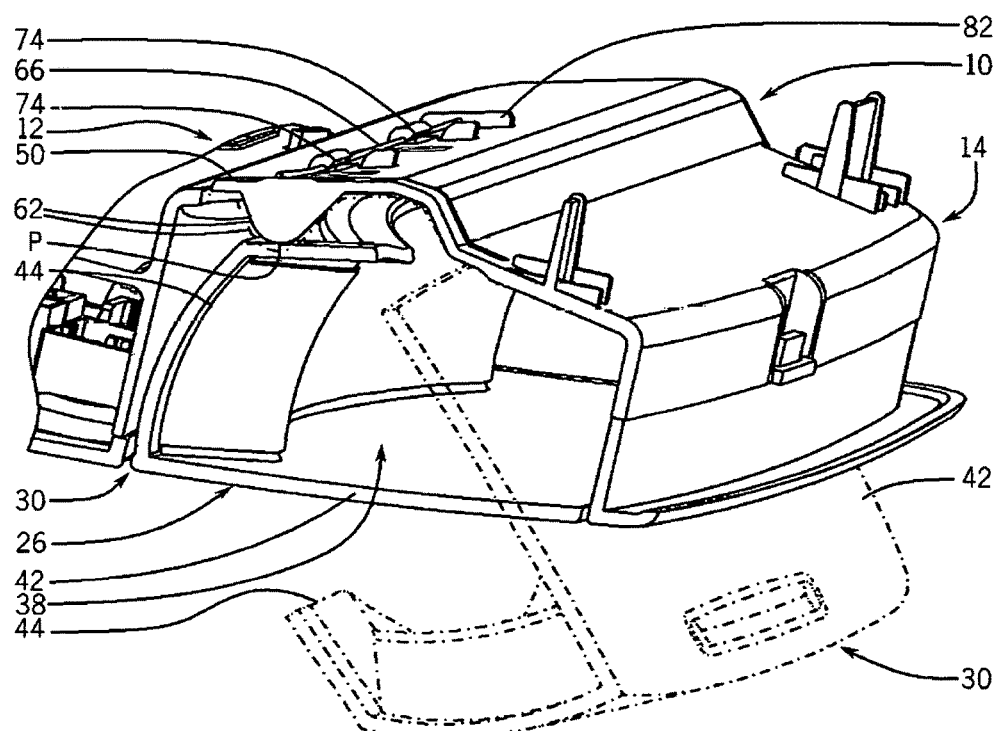
FIG. 4A is a schematic sectional perspective view of a vehicle interior component according to an exemplary embodiment.
Figure 4B:
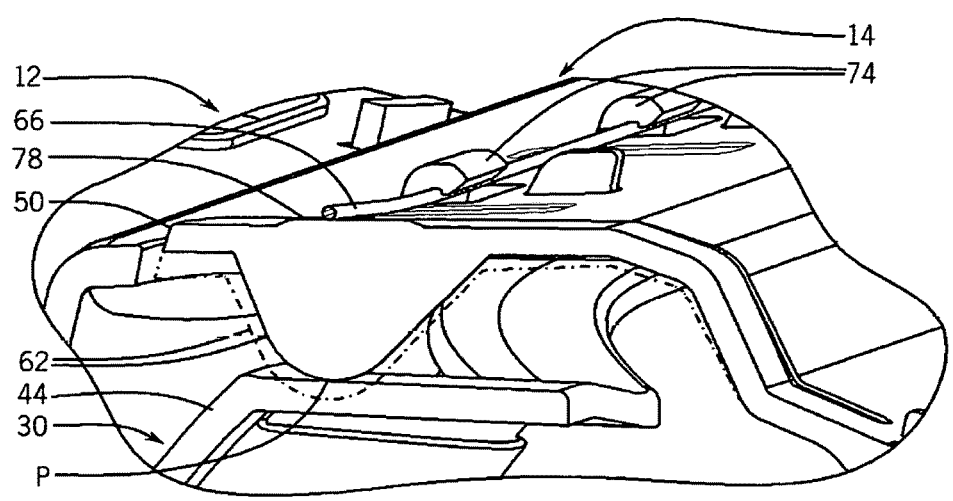
FIG. 4B is a schematic enlarged view of a portion of a vehicle interior component according to an exemplary embodiment.

According to an exemplary embodiment as shown schematically in FIGS. 4A and 4B, cover 30 may be pivotably coupled to housing 14 for movement between a closed position and an open position (shown in broken lines in FIG. 4A). According to an exemplary embodiment, tab 50 may be configured to exert a force against cover 30 when cover 30 is in the closed position. Tab 50 may be configured not to exert any force against cover 30 when cover 30 is in the open position. According to an exemplary embodiment, second portion 58 of tab 50 (see FIG. 3A) may be configured to exert the force against cover 30. In one embodiment, latch 46 may be configured to disengage when the cover 30 is pushed up relative to housing 14. Tab 50 may be configured to at least partially prevent disengagement of latch 46 by biasing cover 30 in a direction opposite the direction needed to disengage latch 46 (see FIGS. 2A and 4A). As shown schematically in FIG. 4A, when cover 30 is in the closed position and latch 46 is engaged, a portion of cover 30 such as rib portion 44 may be configured to engage with protrusion 62. According to an exemplary embodiment, tab 50 may be configured to provide a force through protrusion 62 into cover 30. The force applied by tab 50 to cover 30 may be configured to secure cover 30 within cavity 26. The force may be such that cover 30 may only have a minimal degree of movement within cavity 26 when latch 46 is engaged and cover 30 may not generate noise or rattle due to the vibration of the vehicle. In this way tab 50 may be configured to function similar to a spring or biasing component. When latch 46 is disengaged, cover 30 may be configured to move from the closed position to the open position.

As shown schematically according to an exemplary embodiment in FIGS. 4A-4B and 6A-6B, the tab shown as leaf spring member 50 may be configured to exert no force against cover 30 when cover 30 is in the open position (see FIG. 6A) and to exert the force against cover 30 at a contact point P when cover 30 is in the closed position (see FIG. 6B).

According to an exemplary embodiment as shown schematically in FIGS. 4A and 4B, biasing mechanism 66 may be configured to assist tab 50 in applying the force to cover 30. When cover 30 is in the closed position and latch 46 is engaged, a portion of biasing mechanism 66 may be deflected upward (see FIG. 4B) and may cause the portion of biasing member 66 to exert a supplemental preload force against tab 50. According to an exemplary embodiment, biasing member 66 may be omitted and tab 50 may be configured to provide enough force acting alone to secure cover 30 within cavity 26.

According to an exemplary embodiment as shown schematically in FIG. 5, a component 10a (e.g. a console, storage compartment, a storage bin, a sunglass bin, etc.) for a vehicle interior is shown. Component 10a may comprise a housing 14, a cover 30, a latch 46, a first tab 50a, a second tab 50b, and a biasing member 66. Housing 14 may comprise a cavity similar to cavity 26 shown in FIG. 2B for storing cover 30. According to an exemplary embodiment, cover 30 may comprise a top portion 42, a rim portion similar to rim portion 44 shown in FIG. 4A, and the latch 46. According to an exemplary embodiment, cover 30 may comprise a receptacle or storage compartment similar to storage compartment 38 shown in FIG. 4A. The storage compartment may be configured to hold small items such as sunglasses. Latch 46 may be configured to secure cover 30 to housing 14 in a closed position. According to an exemplary embodiment, latch 46 may be a push-push type latch. Tabs 50a and 50b may comprise first portions 54a and 54b respectively and second portions 58a and 58b respectively. According to an exemplary embodiment, tabs 50a and 50b may comprise leaf springs.

According to an exemplary embodiment, biasing member 66 may be coupled to housing 14 by at least one support member shown schematically in FIG. 5 as hook or hooks 74. As shown schematically in FIG. 5, biasing member 66 may be engaged with large ribs 82a and 82b so as to prevent axial translation of biasing member 66. According to an exemplary embodiment, biasing member 66 may comprise a spring wire. According to an exemplary embodiment, large rib 82a may be integral with tab 50a and large rib 82b may be integral with tab 50b.

According to an exemplary embodiment as shown schematically in FIG. 5, tabs 50a and 50b may be integrally formed with housing 14. According to an exemplary embodiment, tabs 50a and 50b may comprise a respective small rib similar to small rib 78 shown in FIG. 3A. The respective small rib may be configured to contact a portion of biasing member 66 and preload the portion of biasing member 66 with a supplemental preload force when tabs 50a and 50b are in an undeflected state. Tabs 50a and 50b may comprise a respective protrusion similar to protrusion 62 shown in FIG. 3B. The respective protrusion may extend into the cavity of housing 14 and may be configured to engage with and exert a force against cover 30 when cover 30 is in the closed position. According to an exemplary embodiment, the respective protrusion may comprise an arcuate profile. According to an exemplary embodiment, second portions 58a and 58b of tabs 50a and 50b may comprise the respective protrusion.

According to an exemplary embodiment as shown schematically in FIG. 5, cover 30 may be pivotably coupled to housing 14 for movement between a closed position and an open position. According to an exemplary embodiment, tabs 50a and 50b may be configured to exert a force against cover 30 when cover 30 is in the closed position. Tabs 50a and 50b may be configured not to exert any force against cover 30 when cover 30 is in the open position. According to an exemplary embodiment, second portions 58a and 58b of tabs 50a and 50b may be configured to exert the force against cover 30. Tabs 50a and 50b may be configured to at least partially prevent disengagement of latch 46. According to an exemplary embodiment, when cover 30 is in the closed position and latch 46 is engaged, a portion of cover 30 such as the rib portion of cover 30 may be configured to engage with each respective protrusion of tabs 50a and 50b. According to an exemplary embodiment, tabs 50a and 50b may be configured to provide a force through each respective protrusion into cover 30. The force applied by tabs 50a and 50b to cover 30 may be configured to secure cover 30 within the cavity of housing 14. The force may be such that cover 30 may only have a minimal degree of movement within the cavity when latch 46 is engaged and cover 30 may not generate noise or rattle due to the vibration of the vehicle. The total force applied to cover 30 may be evenly balanced or distributed to reduce rattle or vibration of cover 30 during operation of the vehicle or movement of cover 30 between the open and closed positions. In this way tabs 50a and 50b may be configured to function similar to a spring or biasing component. When latch 46 is disengaged, cover 30 may be configured to move from the closed position to the open position.

According to an exemplary embodiment as shown schematically in FIG. 5, biasing mechanism 66 may be configured to assist tabs 50a and 50b in applying the force to cover 30. When cover 30 is in the closed position and latch 46 is engaged, a portion of biasing mechanism 66 may be deflected upward (similar to the deflection of biasing mechanism 66 in FIG. 4B) and may cause the portion of biasing member 66 to exert a supplemental preload force against tabs 50a and 50b. According to an exemplary embodiment, biasing member 66 may be omitted and tabs 50a and 50b may be configured to provide enough force acting alone to secure cover 30 within the cavity of housing 14.

Exemplary Embodiment

According to an exemplary embodiment as shown schematically in FIG. 1C, a storage assembly 10 is shown; the storage assembly 10 being suitable for installation in an interior ceiling or headliner of a vehicle (not shown). As shown schematically in FIG. 1C, the storage assembly 10 is incorporated with an overhead console assembly 12, which may be installed near a rearview mirror of the vehicle and centered between the front seats for easy access to the storage assembly 10 by an operator and/or a passenger of the vehicle. It is to be understood, however, that the console assembly 12 and/or the storage assembly 10 disclosed herein may be used for other applications, and positioned in different orientations or locations within a vehicle. For example, the storage assembly 10 may be incorporated with an overhead console assembly installed in a rear seat area of the vehicle. Also, the storage assembly 10 may be incorporated with a floor console of the vehicle.

According to an exemplary embodiment as shown schematically in FIG. 1C, the console assembly 12 includes a bezel or housing 14 defining a recess or cavity 26 on the bottom of the housing (see FIG. 2B), which is exposed to the vehicle interior. The housing 14 further defines a central axis 28 extending in a direction of length of the vehicle, bisecting the cavity 26 (see FIG. 1C). The housing 14 may additionally include mounting locations for supporting one or more task lights, electronic displays, remote control devices (e.g., door openers), and/or other vehicle accessories. The housing 14 may be molded as a single piece from ABS, polycarbonate, HDPE, or any other suitable rigid or semi-rigid material.

According to an exemplary embodiment as shown schematically in FIG. 1C, the storage assembly 10 includes a storage member 30 pivotably coupled to the housing 14 and positioned at least partly in the cavity 26 (see FIG. 4A). As shown schematically in FIG. 4A, the storage member 30 of storage assembly 10 defines a receptacle 38 sized and shaped to store items such as sunglasses or other types of eyeglasses. Alternatively, the receptacle 38 may be sized and shaped for storing other items, such as portable electronic devices, keys, money, tissues, and the like. The receptacle 38 may be lined with fabric or other soft materials to protect the stowed item(s) from scratches or other damage. The storage member 30 is pivotable relative to the housing 14 about a pivot axis 32 (see FIG. 1C), oriented transverse to the central axis 28, between a closed position (shown in solid lines in FIG. 4A) in which the receptacle 38 is substantially inaccessible, and an open position (shown in broken lines in FIG. 4A) in which the receptacle 38 is accessible.

According to an exemplary embodiment as shown schematically in FIG. 4A, the storage member 30 includes a cover 42 that in tandem with a rim 44 defines the receptacle 38. According to the exemplary embodiment shown schematically in FIG. 4A, when the storage member 30 is in the closed position, the cover 42 is disposed within and substantially fills an opening to the cavity 26, thereby preventing access to the contents in the receptacle 38. As shown schematically in FIG. 4A, the rim 44 extends into the cavity 26 when the cover 42 is in the closed position. According to an exemplary embodiment, the receptacle may alternatively be defined by the housing 14, and the cover 42 may be pivotable relative to the housing 14 between a closed position and an open position like the storage member 30 of FIG. 4A.

According to an exemplary embodiment as shown schematically in FIG. 1C, the storage assembly 10 includes a latch mechanism 46, a portion of which is defined on a side wall of the storage member 30, for securing the storage member 30 in the closed position. The latch mechanism 46 is preferably configured as a push-push latch 46; however, other suitable latches may be employed. The cover 42 of the storage member 30 may be manipulated (i.e., pushed) by the user to disengage the latch mechanism 46 and permit the storage member 30 to pivot towards the open position, allowing access to the receptacle 38 (see FIG. 4A).

Further, according to an exemplary embodiment, the storage assembly 10 may include a biasing member (e.g., a torsion spring, not shown) that exerts a torque on the storage member 30 for biasing the storage member 30 toward the open position. The storage assembly 10 may also include a rotary damper (not shown) to resist abrupt deployment of the storage member 30, as a result of the torque applied to the storage member 30, from the closed position to the open position. Alternatively, the biasing member may be omitted, and the storage member 30 may open under the influence of gravity or a user-applied force alone.

According to an exemplary embodiment as shown schematically in FIG. 1C, the storage assembly 10 includes a leaf spring member 50 configured to exert a preload force against the storage member 30 when in the closed position to prevent inadvertent disengagement of the latch mechanism 46. As shown schematically in FIG. 1C, the leaf spring member 50 includes a first portion 54 attached to the housing 14 and a distal second portion 58 extending therefrom in a cantilevered manner. In the illustrated embodiment, the first portion 54 is integrally formed with the housing 14 on an upper portion thereof (i.e., using an integrally molded living hinge). The bottom of the leaf spring member 50, shown in FIG. 3B, includes an arcuate protrusion 62 extending from the distal second portion 58 for engaging the storage member 30. The arcuate profile of the protrusion 62 facilitates sliding between the storage member 30 and the leaf spring member 50 as the storage member 30 is initially lowered from the closed position, or alternatively nearing the closed position. When the storage member 30 is disengaged from the leaf spring member 50 (e.g., when the storage member 30 is in the open position), it does not exert a preload force against the storage member 30.

According to an exemplary embodiment as shown schematically in FIGS. 1C and 3A, to supplement the inherent resilience of the leaf spring member 50, when the storage member 30 is in the closed position, the storage assembly 10 also includes a biasing member 66 for exerting a supplemental preload force against the storage member 30 (via the leaf spring member 50). In the illustrated embodiment of the storage member, the biasing member 66 is configured as a spring wire 66. However, other suitable biasing members may be used (for example, a compression spring). The spring wire 66 includes a portion affixed to the housing 14 via one or more hooks 74 and a cantilevered portion engaging the leaf spring member 50. The leaf spring member 50 includes a small rib 78 with which the cantilevered portion of the spring wire 66 is in contact for preloading the cantilevered portion of the spring wire 66 when the leaf spring member 50 is in an undeflected state. A pair of large ribs 82 is also provided, one of which is formed on the leaf spring member 50 and the other of which is formed on the housing 14, for axially constraining the spring wire 66 relative to the housing.

According to an exemplary embodiment as shown schematically in FIG. 1C, the leaf spring member 50 is positioned adjacent a side of the housing 14 (i.e., on one side of the central axis 28). In alternative embodiments, the leaf spring member 50 may be positioned in another location, such as aligned with the central axis 28. In another embodiment of the invention shown in FIG. 5, the storage assembly 10a includes two leaf spring members 50a and 50b positioned on opposite sides of the central axis 28 that are preloaded by a longer, single spring wire 66. Otherwise, like features and components to the storage assembly 10 of FIG. 1C are identified with like reference numerals. According to the exemplary embodiment shown schematically in FIG. 5, both of the leaf spring members 50a and 50b may exert a preload force against the storage member 30, as assisted by the spring wire 66. As a result, the total preload force applied to the storage member 30 is more balanced compared to the embodiment of FIG. 1C. More than two leaf spring members 50a and 50b may alternatively be provided.

According to the exemplary embodiment shown schematically in FIGS. 1 to 4B, the storage member 30 may be opened from the closed position by a user pushing against the cover 42 to disengage the latch mechanism 46. The biasing member, user-applied force, and/or gravity exert a torque on the storage member 30, causing it to rotate about the pivot axis 32 toward the open position. During rotation, the rotational damper resists abrupt deployment of the storage member 30. In the open position, the user may easily stow or remove an item from the receptacle 38. Once finished, the user applies a force or pushes against the cover 42 to return the storage member 30 to the closed position and engage the latch mechanism 46, concealing any stowed items or articles between the cover 42 and the vehicle ceiling.

According to the exemplary embodiment shown schematically in FIGS. 1 to 4B, as the user closes the storage member 30, the leaf spring member 50 is engaged by the rim 44 of the cover 42 and flexed from an undeflected state (shown in dashed lines in FIGS. 4A and 4B) toward a deflected state. When the storage member 30 is in the closed position, the leaf spring member 50 may assume a deflected state in which the natural resilience of the leaf spring member 50 is supplemented by the spring wire 66 to exert a biasing force against the cover 42 (via the rim 44). The biasing force exerted by the leaf spring member 50 and the spring wire 66 may prevent the storage member 30 from inadvertently pivoting upward to disengage the latch mechanism 46. Additionally, the biasing force exerted by the leaf spring member 50 and the spring wire 66 may eliminate slack or looseness otherwise inherent in the latch mechanism 46 to prevent the storage member 30 from vibrating, squeaking, and/or rattling within the housing 14 during operation of the vehicle. In an alternative embodiment of the storage assembly 10 in which the receptacle is defined by the housing 14, the leaf spring member 50 may directly engage the cover 42 in the deflected state of the spring member 50.

According to an exemplary embodiment as shown schematically in FIGS. 1C to 4B, the leaf spring member 50 is a suitable replacement for rubber bumpers ordinarily used in overhead console assemblies including a sunglasses bin or storage member like that shown in FIG. 4A. Such bumpers are separate components that must be attached to the console housing (e.g., using adhesives or mechanical fastening details) using a secondary manufacturing process. When the sunglasses bin or storage member in an overhead console assembly using such rubber bumpers is closed, the bumpers are compressed and effectively mimic a spring having a non-linear (i.e., second or third order) force-deflection relationship (or spring rate), requiring the user to exert a progressively increasing amount of force to open the sunglasses bin or storage member per unit of displacement, yielding a poor tactile sensation to the user. In contrast, the leaf spring member 50 in the storage assembly 10, or the two leaf spring members 50 in the storage assembly 10a, provide a linear force-deflection relationship (or spring rate), which in turn yields a more desirable tactile sensation to the user because less force is required to return the storage member 30 to the closed position.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. All such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions may comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A component for a vehicle interior comprising:
   (a) a housing comprising a tab; and
   (b) a cover pivotally coupled to the housing for movement between a closed position and an open position for access;
   wherein the tab is integrally formed with the housing;
   wherein the tab is configured so that when the cover is in the closed position the tab engages with the cover.

2. The component of claim 1 wherein the tab comprises a first portion coupled to the housing and a second portion configured to exert a force against the cover in the closed position.

3. The component of claim 2 wherein the second portion comprises a protrusion configured to exert the force against the cover in the closed position.

4. The component of claim 3 wherein the protrusion comprises an arcuate profile.

5. The component of claim 1 further comprising a latch configured to secure the cover to the housing in the closed position, wherein the tab is configured to at least partially prevent disengagement of the latch.

6. The component of claim 1 wherein the tab does not exert any force against the cover when in the open position.

7. The component of claim 2 wherein the force comprises a preload force.

8. The component of claim 1 wherein the tab comprises a leaf spring.

9. The component of claim 1 wherein the component comprises at least one of (a) a storage assembly, (b) a sunglass bin, (c) a console.

10. A component for a vehicle interior comprising:
    (a) a housing comprising a tab;
    (b) a cover pivotally coupled to the housing for movement between a closed position and an open position for access; and
    (c) a biasing member coupled to the housing;
    wherein the tab is configured so that when the cover is in the closed position the tab engages with the cover;
    wherein the biasing member is configured to exert a first force against the cover through the tab.

11. The component of claim 10 wherein the tab is configured to exert a second force against the cover in the closed position.

12. The component of claim 10 wherein the biasing member comprises a spring wire.

13. The component of claim 10 wherein the housing comprises at least one hook configured to couple the biasing member to the housing.

14. The component of claim 10 wherein the tab comprises a rib configured to engage the biasing member to prevent axial translation of the biasing member.

15. The component of claim 10 wherein the tab is integrally formed with the housing.

16. The component of claim 10 wherein the tab comprises a first portion coupled to the housing and a second portion configured to exert a second force against the cover in the closed position.

17. The component of claim 10 further comprising a latch configured to secure the cover to the housing in the closed position wherein the tab is configured to at least partially prevent disengagement of the latch.

18. The component of claim 10 wherein the tab does not exert any force against the cover when in the open position.

19. A component for a vehicle interior comprising:
    (a) a housing comprising a tab; and
    (b) a cover pivotally coupled to the housing for movement between a closed position and an open position for access;
    wherein the tab is configured so that when the cover is in the closed position the tab engages with the cover;
    wherein the cover is configured to deflect the tab when the cover is in the closed position;
    wherein the tab is configured to bias the cover to remain in the closed position.

20. The component of claim 19 wherein the tab is configured so that when the cover is in the open position the tab is not in contact with the cover and when the cover is in the closed position the tab exerts a force against the cover.

* * * * *